Nov. 17, 1931.       C. N. FAIRCHILD       1,832,540
LOCKING REMINDER
Filed April 19, 1924
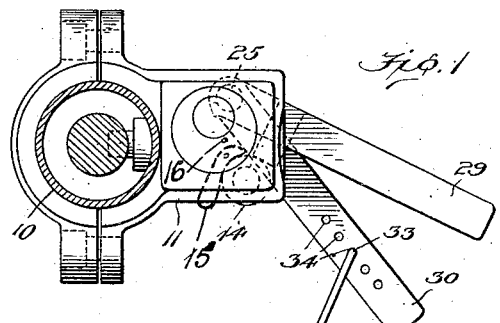
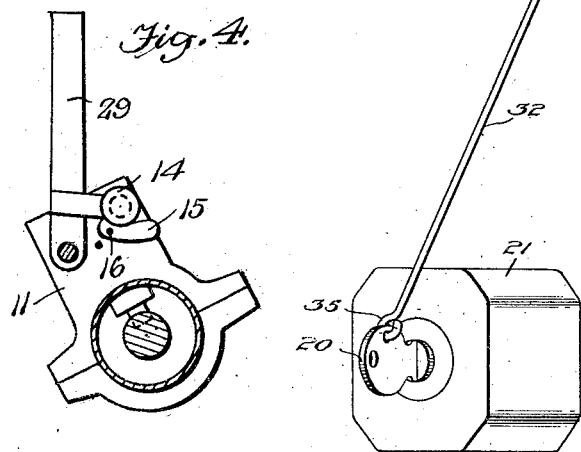
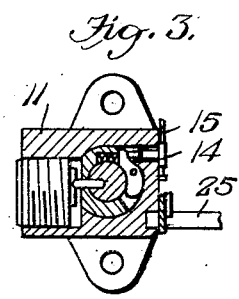
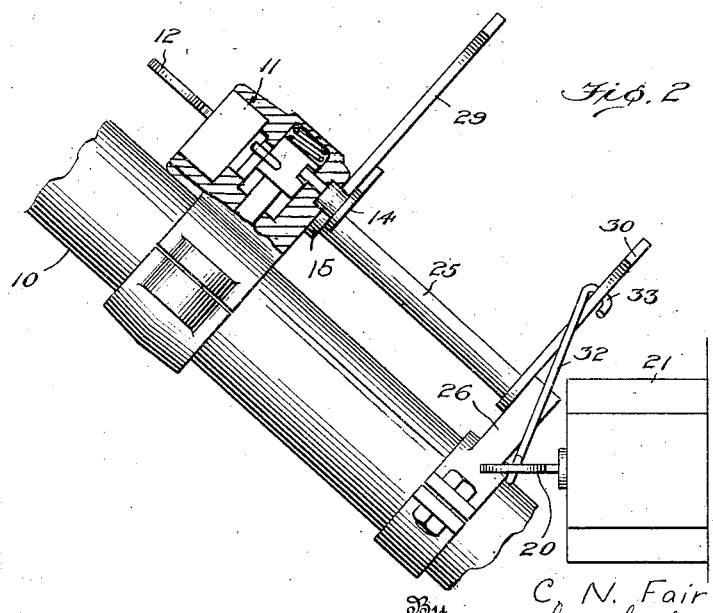

Patented Nov. 17, 1931

1,832,540

UNITED STATES PATENT OFFICE

CHARLES N. FAIRCHILD, OF NEW YORK, N. Y., ASSIGNOR TO FAIRCHILD LOCK CORPORATION, OF THE COUNTY OF NEWCASTLE, DELAWARE

LOCKING REMINDER

Application filed April 19, 1924. Serial No. 707,773.

This invention relates to automobile locks and has for its object the provision of means which will prevent the owner of a car from locking the ignition without locking of the car.

The underwriters sell theft insurance for automobiles at different rates, the rate for example for a car which has a steering post lock is considerably less than the insurance on the same car not provided with such lock; the thought being that the lock will be used. Unfortunately for the insurance companies, however, owners secure the lower rate and then fail to lock their cars and if the car is stolen when unlocked the insurance company has to pay the insurance and loses the difference between the two rates.

The principal object of the present invention is to remind the owner of the fact that his car is not locked. The invention is not to prevent the owner from turning off the ignition without locking the car, but is to prevent the owner from inadvertently doing so and the arrangement of parts is such that the ignition switch cannot be thrown from "on" to "off" unless the car is locked.

In the drawings,—

Fig. 1 is a plan view of the device.

Fig. 2 is an elevation.

Fig. 3 is a section transversely through the head of the locking bolt.

Fig. 4 is a bottom plan.

The means for locking the steering post rod against movement about its axis may be any one of the usual types but is preferably a lock of the kind shown in my Patent 1,592,088 granted July 13, 1926, on an application filed October 18, 1923, wherein there is a housing 11 firmly secured to the tube 10 and unlocked by mechanism controlled by a key 12 and having an element 14 which we will call, in this specification, the push-button, the function of which is to initiate the locking of the steering post rod to the tube 10 and housing 11, to prevent turning of the steering wheel. A safety catch 15 pivoted at 16 is spring-pressed into the path of the head of the push button or trip 14 so as to prevent accidental pushing in of this trip to release the locking bolt. This safety catch is an old and well known feature and is moved manually out of the path of the trip when it is desired to lock the steering wheel. In absence of such a safety catch there would always be danger of the trip being accidentally struck while the automobile was in motion which would take from the operator the control of the car.

The invention proper concerns a means for preventing an inadvertent turning of the key in the ignition system. This key 20 in the drawings governs the ignition system circuit and when the lock in the housing 21, which being a part of the regular equipment of certain automobiles is located in the usual manner on the cowl, is in locked position the ignition circuit is broken but when turned by the key 20 to unlocked position the ignition circuit is closed and the engine runs. I mount a substantially vertical shaft 25 in a bracket 26 which I secure to the tube 10 and in a hole which I bore in the housing 11 (if such hole is not already there) to accommodate the top of the shaft 25.

The shaft 25 carries an upper or manually controlled arm 29 and a similar but lower arm 30 forming in effect a bell crank lever which lever is connected to the key 20 by means of a rod 32. Preferably the end of the rod 32 is bent downward as at 33 and there is a plurality of holes as 34 in the lower arm 30 so that, in accordance with the size of the key 20, I place the end 33 in the proper hole and when once in the proper hole I bend over the end 33 so that the rod 32 cannot be removed. The joint or hook 35 at the key end of the rod 32 is also preferably closed as it is not the intention to remove the rod 32 after it is installed for the first time.

The ignition system and the key 20 are part of the standard equipment and the locking mechanism is a standard accessory and in the newer types of such locks a hole is already provided for the reception of the upper bearing of the shaft 25 so that to install my device on an automobile provided with such steering post lock it is merely necessary to secure the clamp 26 about the tube or casing 10, bore a hole in the key 20 for the rod 32, place the end 33 in the proper hole and the device is ready for use.

The operation is as follows: The driver stops the car and desires to get out. The engine is of course running; he naturally desires to shut off the engine by opening the ignition system but he cannot turn the key 20 because it is connected to the bell crank lever 25, 29, 30, and in order to turn the key 20 the arm 29 must make an angular movement. The push-button 14, however, lies in the way and prevents movement of the arm and consequently of the key. The driver must therefore push up the button 14 to allow the arm 29 to pass and this movement of the button locks the steering post. If the driver remembers to lock the steering post he does not need to touch the ignition key 20 at all, he merely pushes up the button 14 and then swings over the lever 29, this automatically shutting off the engine. When the driver comes back to the car he inserts the key 12 in the steering post lock, unlocks the steering post mechanism and this brings the push-button 14 into contact with the lever 29. The driver now moves the lever 29 to close the ignition circuit and the spring-pressed button advances further down into arm locking position as before.

What I claim is:

1. The combination with an automobile lock of the type which includes a manually operated bolt releasing member, of manually controlled means for opening and closing the ignition circuit, a portion of said last-mentioned means lying in the path of the bolt releasing member whereby opening of the ignition circuit is prevented while the steering rod mechanism is in unlocked position.

2. The combination with an automobile lock having a projecting member, of an ignition system including a circuit manually opened and closed, and a bell crank lever connected at one end to the ignition opening and closing mechanism and at the other end lying in the path of said projecting member.

3. The combination with an automobile lock including a trip, of an arm pivoted so as to pass said trip when same is in locked position but to contact therewith when the trip is in unlocked position, ignition circuit opening means, and mechanism connecting said last-mentioned means with said arm whereby the ignition circuit may be opened by movement of said arm when said trip is in locked position.

4. In an automobile of the type having a steering post lock operated by a trip and having a key-operated ignition control, a bell crank lever, means for connecting one arm of said lever to the key of the ignition control, the other arm of said bell crank lever being positioned so as to swing past said trip when said trip is in locked position and to contact with said trip when said trip is in unlocked position.

5. In combination, an ignition switch, a bolt releasing trip, and means secured to said switch and lying in part in the path of said trip to limit movement of said switch in one position of the trip.

6. In combination, an ignition switch, a key therefor, a bolt releasing trip, and means secured to said switch key and lying in part in the path of said trip to prevent opening of the ignition circuit by said key when the trip is in unlocked position.

7. The combination with a manually operated ignition circuit switch, of a bolt releasing trip, a safety catch to prevent accidental operation of the trip and means for preventing operation of the switch when said catch is in safety position.

8. The combination with means which may be moved to protective position for preventing unauthorized use of the steering gear of an automobile and means which may be moved to protective position for preventing unauthorized use of the motive power of said automobile, of means for preventing the placing of the last mentioned means in protective position before the first mentioned means is placed in protective position, and means preventing accidental operation of the first means.

9. The device of claim 8 in which the first means is a key operated steering post lock, and the second means is a key operated device for making and breaking the ignition circuit.

10. The combination with a key operated steering post lock, an ignition switch, means for holding the ignition switch in circuit opened position, of means connecting the lock and switch to prevent the opening of the ignition circuit before the steering post lock is moved to locked position.

11. The device of claim 21 in which the mechanical device includes a member to disable the control of the automobile.

12. The device of claim 21 in which the operation of the electrical device causes the motor mechanism of the car to stop.

13. The device of claim 21 in which the mechanical device includes a slidable steering post locking bolt and the electrical device rotates to make and break the ignition circuit.

14. The combination with a spring pressed locking bolt to prevent unauthorized use of the steering gear of an automobile, a key operated device for moving the bolt to unlocked position against the spring, a detent mechanism for holding the bolt in such unlocked position, and means which may be moved to protective position for preventing unauthorized use of the motive power of an automobile, of a member swinging in the path of the detent mechanism to prevent the placing of the last mentioned means in protective position before the locking bolt is moved to locking position.

15. In combination, a non-removable housing to surround a steering post casing, a spring pressed sliding member therein, a key operated rotary lock within the housing for moving said member, a rotary device for making and breaking the ignition circuit and means connecting the lock and the device so that when the device is rotated to break the ignition circuit the sliding member is moved to one limit of its travel and when the lock is turned to bring said spring pressed member to the other limit of its travel the device may be rotated to complete the ignition circuit.

16. In a protective device, a spring pressed locking bolt, a key controlled lock for moving the bolt, a rotary ignition switch, and mechanism connecting the lock and switch so that the shutting off of the ignition circuit cannot precede the movement of the bolt to locking position.

17. In a steering post locking device, a housing to surround a steering post casing, a bolt sliding within the housing to lock the steering post to the steering post casing, a spring urging the bolt toward the steering post, an independently movable ignition circuit switch member movable to "off" position with the ignition circuit broken and movable to "on" or "running" position with the ignition circuit closed, key controlled rotary lock mechanism for moving the bolt from locking position and means connected to the lock and to the switch member so that movement of the switch member from "on" to "off" cannot precede movement of the locking bolt to locked position but can follow completion of the locking movement of the bolt, said switch member being freely movable from "on" to "off" and from "off" to "on" when the bolt is in locked position.

18. The device of claim 17, in which the cooperating means includes a manually operated sliding member and a manually operated lever having its axis parallel to the sliding member.

19. In a device for preventing unauthorized use of an automobile, a spring pressed bolt, two cooperating means both of which must be simultaneously operated to release the bolt so as to permit the bolt to move to locked position, an ignition circuit make and break device including a shaft, and means preventing movement of the shaft from ignition closed position without first moving the bolt to locked position whereby the driver must lock his car before he can shut off his engine.

20. In an automobile having means for holding a mechanical part against movement and an electric switch, a lock for said holding means, means adapted to operate both said lock and said switch, and means whereby when said operating means is moved in one direction said mechanical part is unlocked and said switch is moved to closed circuit position, and when said operating means is moved in another direction said switch is opened and said holding means is moved to a position locking said mechanical part.

21. In a key operated protective mechanism for preventing use of an automobile, a mechanical device and an electrical device, movable means manually actuable to one position for causing the mechanical device to become operative for the purpose stated, said means being normally positioned to prevent movement of the electrical device into operative position, and said electrical device, when in operative position, preventing movement of said movable means to normal position and thus preventing actuation of said mechanical device to inoperative position.

CHARLES N. FAIRCHILD.